US006870791B1

(12) United States Patent
Caulfield et al.

(10) Patent No.: US 6,870,791 B1
(45) Date of Patent: Mar. 22, 2005

(54) ACOUSTIC PORTAL DETECTION SYSTEM

(76) Inventors: David D. Caulfield, 51132 Range Road 261, Spruce Grove, Alberta (CA), T7Y 1B8; Michael Curran, 47 Bridgham Farm Rd., Rumford, RI (US) 02916; Robert Tarini, 46 Bell School House Rd., Richmond, RI (US) 02892

( * ) Notice: Subject to any disclaimer, the term of this patent is extended or adjusted under 35 U.S.C. 154(b) by 82 days.

(21) Appl. No.: 10/328,023

(22) Filed: Dec. 26, 2002

(51) Int. Cl.[7] ............................................. G03B 42/06
(52) U.S. Cl. ........................................... 367/11; 367/96
(58) Field of Search ............................. 367/87, 99, 96, 367/103, 105, 7, 11, 8; 73/625, 628, 642, 632; 600/437

(56) References Cited

U.S. PATENT DOCUMENTS

| | | | |
|---|---|---|---|
| 4,094,304 A | * 6/1978 | Wright, Jr. ................... 600/552 |
| 4,439,845 A | 3/1984 | Geohegan, Jr. et al. ....... 367/87 |
| 4,855,911 A | 8/1989 | Lele et al. ............. 364/413.25 |
| 4,922,467 A | 5/1990 | Caulfield ..................... 367/87 |
| 5,512,834 A | 4/1996 | McEwan ..................... 324/642 |
| 5,563,848 A | 10/1996 | Rogers et al. ................. 367/99 |
| 5,859,609 A | * 1/1999 | Sheen et al. ..................... 367/8 |
| 5,974,881 A | 11/1999 | Donskoy et al. .............. 73/579 |
| 5,979,240 A | 11/1999 | Rix et al. ..................... 73/602 |
| 6,044,336 A | 3/2000 | Marmarelis et al. ......... 702/190 |
| 6,094,472 A | * 7/2000 | Smith ........................... 378/86 |
| 6,366,232 B1 | 4/2002 | Liedtke et al. ................ 342/22 |
| 6,545,945 B2 | 4/2003 | Caulfield ..................... 367/87 |

FOREIGN PATENT DOCUMENTS

| | | | |
|---|---|---|---|
| DE | 41 36 587 | 5/1993 | |
| WO | WO 90/00749 | 1/1990 | |
| WO | WO9921148 | * 4/1999 | ........... G08B/23/00 |

OTHER PUBLICATIONS

Diaz et al.; Non–Invasive Ultrasonic Instrument for Counter–Terrorism and Drug Interdiction Operations– the Acoustic Inspection Device (AID); May 2003; pp. 1275–1280.*
Paulter; Guide to the Technologies of Concealed Weapon and Contraband Imaging and Detection Feb. 2001; pp. 17–18.*

* cited by examiner

*Primary Examiner*—Daniel Pihulic

(57) ABSTRACT

Airports and other public places require security measures for the screening of human subjects for illicit objects and materials concealed from view beneath clothing. However, at present most of such screening processes involve only metal detectors, which are inherently incapable of detecting non-metallic illicit objects and materials. For this reason, there remains a strong need for novel systems and methods that can detect all types of materials. The present invention provides for a portal detection system that is configured for safe, rapid, and non-invasive scanning of human subjects. For this purpose, the portal detection system utilizes acoustic technology to achieve this end. The portal detection systems of the present invention may optionally be used in conjunction with conventional metal detection means. The invention encompasses portal detection systems, their use in scanning human subjects, and corresponding methods of scanning human subjects for illicit objects and substances.

46 Claims, 6 Drawing Sheets

ACOUSTIC PORTAL DETECTION SYSTEM

FIELD OF THE INVENTION

The present invention relates generally to the field of human subject scanning. In particular, the invention pertains to methods and systems for the detection of objects concealed by human clothing and/or human skin without physical contact with the human subject. The invention is intended for use in many applications, including airport security.

BACKGROUND TO THE INVENTION

There is an increasing need to improve the level of security of public buildings, as well as specified areas within such buildings. One example includes the security of airport terminal buildings, which manage high volumes of passenger traffic on a daily basis. Typically, a specific region of an airport building may be designated as a 'secure area', wherein all personnel and their belongings are screened prior to entry into the secure area. Secure areas may include the departure lounge, and the gates used to assemble passengers prior to boarding the aircraft.

Baggage and other personal items can be screened using X-ray techniques and other techniques that are well known in the art. Such techniques permit analysis of the internal contents of the baggage for metallic items such as knives, guns, and explosive devices, as well as non-metallic illicit materials such as drugs and plastic explosives.

In contrast, passenger screening is not conducive to X-ray analysis, due to the potentially harmful effects of X-ray irradiation upon the human subject. Limited and carefully directed exposure to X-rays may be beneficial for medial diagnostic purposes. However, it is well known that exposure to X-rays should be avoided to minimize the risk of cellular and genetic defects. Therefore, it is unacceptable to expose airline passengers to X-rays on a routine basis for security purposes, particularly considering that whole-body irradiation would be required.

Commonly, the security measures employed for airline passenger screening include metal detectors. These metal detectors typically take the form of a freestanding doorway or 'portal' of sufficient size for a passenger to walk through unimpeded. The metal detectors simply sense the presence of metallic objects that may be concealed beneath the clothing or skin of the human. When the metal detector senses a quantity of metal that is above a pre-determined threshold, an alarm is trigger to alert the operator. The human passing through the metal detector may subsequently be subjected to a more thorough inspection, e.g. by passing a portable 'wand-like' metal detector in close proximity to the body and clothes of the human, to pinpoint the location of the metal more accurately.

Generally, passengers are not screened for objects other than metallic objects. This provides a window of opportunity for a would-be criminal to breach the security systems by attempting to smuggle illicit non-metallic objects into secure areas. Such illicit items may include for example drugs, plastic explosive materials, plastic or glass weapons, endangered animal parts etc. These items are generally of a size and shape that permits facile concealment beneath the clothing and/or the skin of a human. For this reason, there remains a strong need to develop security systems for use in airports and other secure locations, to detect such illicit objects and prevent their transfer into secure areas.

SUMMARY OF THE INVENTION

The present invention provides systems and methods for rapidly, efficiently, and non-invasively scanning human subjects for non-clothing objects, including both metallic and non-metallic objects, which are concealed from view. For this purpose, the invention provides a portal detection system that scans each human subject using acoustic technology. Specifically, acoustic energy is directed towards the human subject, and portions of the energy are reflected and/or refracted by the human subject (and the non-clothing object if present). These reflected/refracted portions of energy are detected to generate a scan profile, indicative of whether (or not) any objects are concealed beneath the clothing of the subject. Human subjects are directed to move towards, through and beyond the portal, during which time the acoustic scanning takes place. The portal may be configured to scan the human subject from multiple angles, thereby ensuring proper scanning coverage of the various surfaces of the subject. The portal detection systems described herein can detect the presence or absence of many non-metallic illicit objects including plastic explosives, drugs, and weapons. Moreover, the portal detection system may be combined with any convention metal detection means to provide significant improvements to airport and other building security.

In one aspect, the present invention provides for a portal detection system for remote detection of an object concealed beneath clothing of a human subject, the portal detection system comprising:
  one or more acoustic energy transmitters for generating acoustic energy and directing the acoustic energy towards the human subject;
  one or more acoustic energy detectors for detecting acoustic energy reflected and/or refracted from the human subject, to generate acoustic energy signals;
  signal processor means for processing the acoustic energy signals to generate one or more scan profiles of the human subject;
  comparator means for comparing the scan profile with known scan profiles to detect a presence of the object.

Preferably, the portal detection system further comprises a frame defining a passage of a size sufficient for movement there through of the human subject, the one or more acoustic energy transmitters and the one or more acoustic energy detectors mounted to the frame. More preferably, the one or more acoustic energy transmitters comprises a plurality of acoustic energy transmitters for directing acoustic energy towards the human subject from more than position on the frame. In addition, the one or more acoustic energy detectors preferably comprises a plurality of acoustic energy detectors for detecting acoustic energy reflected and/or refracted from the human subject from more than one position on the frame.

The portal detection system preferably comprises at least three arrays, each array mounted on the frame and comprising one or more acoustic energy transmitters and one or more acoustic energy detectors, wherein:
  a first array is mounted on the frame to transmit and detect acoustic energy on a first side of the frame;
  a second array is mounted to the frame to transmit and detect acoustic energy in a region within and directly adjacent to the frame; and
  a third array is mounted to the frame to transmit and detect acoustic energy on a second side of the frame.

More preferably, the portal detection system is configured to scan a human subject moving through the portal from multiple angles, wherein:
  the first array is oriented to scan front surfaces of the human subject upon approach and entry into the portal;
  the second array is oriented to scan side surfaces of the human subject upon passage through the portal; and the third array is oriented to scan back surfaces of the human subject upon exit and movement away from the portal.

In a preferred aspect, the first array may comprise two or more transmitters angled towards a main axis of the passage on the first side of the frame, whereby acoustic energy emanating directly from transmitters of the first array intersects the main axis on the first side of the frame. More preferably, the first array scans the human subject multiple times upon approaching the portal, the signal processor processing each resulting acoustic signal to determine a peak acoustic signal for the first array, the signal processor further processing the peak acoustic together with acoustic signals derived from the second and third arrays, to generate the scan profile.

In an alternative aspect, the third array comprises two or more transmitters angled towards a main axis of the passage on the second side of the frame, whereby acoustic energy emanating directly from transmitters of the third array intersects the main axis on the second side of the frame. More preferably, the third array scanning the human subject multiple times upon exiting the portal, the signal processor processing each resulting acoustic signal to determine a second peak acoustic signal for the third array, the signal processor further processing the second peak acoustic signal together with acoustic signals derived from the first and second arrays, to generate the scan profile.

In preferred aspect, the portal detection system of the present invention further comprises tracking means for tracking movement of the human subject towards, through and beyond the portal, the tracking means in communication with, and inducing activation of, each array of the one or more acoustic energy transmitters and the one or more acoustic energy detectors, to follow and maintain scanning contact with the human subject. Most preferably, the tracking means is selected from the group consisting of: one or more floor pads, one or more light sensors, and one or more laser sensors. Alternatively, the tracking means preferably comprises the one or more acoustic energy transmitters and the one or more acoustic energy detectors.

The portal detection system, in alternative aspects, may comprise one or more acoustic energy detectors that are moveable about the portal to direct the acoustic energy towards the human subject from more than one angle. In addition, the one or more acoustic energy detectors may also be moveable about the portal to detect acoustic energy reflected and/or refracted from the human subject from more than one angle. These aspects may also include tracking means for tracking movement of the human subject towards, through and beyond the portal, the tracking means in communication with, and inducing movement of the one or more acoustic energy transmitters and the one or more acoustic energy detectors, to follow and maintain scanning contact with the human subject. Preferably, the tracking means is selected from the group consisting of: one or more floor pads, one or more light sensors, and one or more laser sensors. Alternatively, the tracking means preferably comprises the one or more acoustic energy transmitters and the one or more acoustic energy detectors.

In another aspect of the present invention, the portal detection system may comprise two or more groups of one or more acoustic energy transmitters and one or more corresponding acoustic energy detectors, each group of transmitters and detectors scanning a predetermined portion of the human subject during passage through the portal, the signal processor processing each acoustic signal derived from each group of transmitters and detectors, to generate a separate scan profile for each group indicative of each scanned portion of the human subject, the comparator means comparing each scan profile for each group with known scan profiles to determine a presence, and a location, of the object upon the human subject. Preferably, each group scans the human subject at a predetermined scan time, the signal processor differentiating each group according to each predetermined scan time.

In a preferred aspect of the portal detection system of the present invention, each acoustic energy detector is a compound acoustic energy detector comprising a cluster of spatially separated acoustic energy detectors.

In another aspect of the present invention, the portal defection system may comprise multiple acoustic energy detectors each detecting acoustic energy derived from a single pulse of acoustic energy reflected and/or refracted by the object, the signal processor calculating a time of detection of the acoustic energy by each of the multiple detectors, a distance of the object from each of the multiple detectors, and a position of the object relative to each of the multiple detectors, thereby determining a location of the object upon the human subject. Preferably, the position of the object relative to the multiple detectors is determined by triangulation. In an alternative aspect, the position of the object relative to the multiple detectors is preferably calculated according to equations 1, 2, and 3:

$$(x-x_1)^2+(y-y_1)^2+(z-z_1)^2=R_1^2 \quad (1)$$

$$(x-x_2)^2+(y-y_2)^2+(z-z_2)^2=R_2^2 \quad (2)$$

$$(x-x_3)^2+(y-y_3)^2+(z-z_3)^2=R_3^2 \quad (3)$$

where $(x_1, y_1, z_1)$, $(x_2, y_2, z_2)$ and $(x_3, y_3, z_3)$ are co-ordinates in three dimensional space indicative of the locations of three detectors, and $R_1$, $R_2$, and $R_3$ are distances of each detector from the object.

Preferably, the portal detection system of the present invention further includes shoe scanning means connected to the signal processor for scanning shoes worn upon the human subject, for detecting one or more objects concealed within the shoes. More preferably, the shoe scanning means includes one or more acoustic energy transmitters oriented to direct acoustic energy towards the shoes, and one or more acoustic energy detectors oriented to receive acoustic energy reflected or refracted from the shoes. Alternatively, the portal detection system may comprise a floor plate, wherein the shoe scanning means is integral with the floor plate. In this regard the floor plate preferably comprises a material of substantially similar density and material to materials commonly used in shoe sole manufacture, thereby improving acoustic coupling through an interface between the floor plate and the lower layer(s) of each shoe. Alternatively, the shoe scanning means preferably includes one or more acoustic energy transmitters and one or more acoustic energy receivers mounted on a lower portion of the frame.

In a preferred aspect, the portal detection system of the present invention may further include sensing means for sensing a presence of the human subject and initiating activation of the one or more acoustic energy transmitters and the one or more acoustic energy detectors for a predetermined time window, the scan profile generated within the predetermined time window. In another preferred aspect, the system further includes display means, the signal processor means calculating a position of the object relative to the human subject, the display means providing schematic illustration of the position.

In a preferred aspect of the portal detection system of the present invention, the signal processor processes the acoustic signals to generate the scan profile, the scan profile comprising a reflection coefficient, the comparator means comparing the scan profile to known scan profiles each comprising a known reflection coefficient, to determine a presence of the object. Preferably, the reflection coefficient is calculated according to equation 4:

$$R=(Z1-Z2)/(Z1+Z2) \quad (4)$$

where

R=reflection coefficient (db)

Z1=impedance of the layer prior to the reflecting surface

Z2=impedance of the reflection layer.

Preferably, the acoustic energy transmitter directs acoustic energy comprising multiple known frequency components to the human subject, the signal processor processing the acoustic signals to generate the scan profile, the scan profile comprising a rate of change of absorption as a function of frequency, the comparator means comparing the scan profile to known scan profiles each comprising a known rate of change of absorption as a function of frequency, to determine a presence and/or a substance of the object.

Preferably, the signal processor further processes the acoustic energy signals to generate an object signature characteristic of the substance of the object, the object signature forming part of the scan profile, the comparator means comparing the scan profile with known scan profiles to identify the presence of the object and the substance of the object. More preferably, the signal processor means further processes the reflected and/or refracted acoustic energy signals, to calculate an acoustic impedance, an acoustic velocity and/or absorption of the object, the object signature being derived at least in part from the acoustic impedance, the acoustic velocity and/or absorption of the object.

In another preferred aspect of the portal detection system, the signal processor compensates for different acoustic properties of each type of clothing. In another preferred aspect, the one or more acoustic energy transmitters, and the one or more acoustic energy detectors of the portal detection system scans the human subject multiple times to generate multiple acoustic energy signals.

In another embodiment of the present invention, there is provided a portal detection system for remote detection of an object concealed beneath the skin of a human subject, the portal detection system comprising:

one or more acoustic energy transmitters for generating acoustic energy and directing the acoustic energy towards the human subject;

one or more acoustic energy detectors for detecting acoustic energy reflected and/or refracted from the human subject, to generate acoustic energy signals;

signal processor means for processing the acoustic energy signals to generate one or more scan profiles of the human subject;

comparator means for comparing the scan profile with known scan profiles to detect a presence of the object beneath the skin.

Preferably, the signal processor and comparator means enable differentiation between each layer of skin and/or clothing to determine the layer comprising the object.

The portal detection system of the present invention, in any of its forms, may preferably further comprise metal detection means. Such metal detection means may typically involve any conventional form of metal detection systems and methods.

In another aspect of the present invention, there is provided a use of a portal detection system of the present invention for scanning a human subject for one or more objects concealed beneath the clothing and/or skin of the human subject.

In another aspect of the present invention, there is provided a method of scanning a human subject for one or more objects concealed beneath the clothing and/or skin of the human subject, the method comprising the steps of:

providing a portal detection system according to the present invention; and passing the human subject through the portal detection system to detect the one or more objects.

DEFINITIONS

Figure 1A:
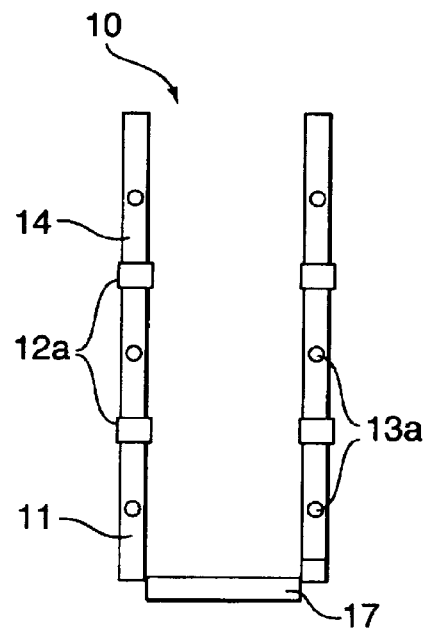
FIG. 1a illustrates a front view of the first embodiment of the present invention.

'Array' pertains to an array of one or more acoustic energy transmitters or detectors, and generally refers to a group of transmitters or receivers that are oriented to scan a broad general surface of the human subject. In one example, the portal detection system of the present invention may be configured to include three arrays of transmitters and receivers: a first array to scan front surfaces of a human subject approaching the portal, a second array of detectors and receivers to scan side surfaces of the human subject passing through the portal, and a third array of transmitters and receivers for scanning a rear portion of the human subject.

'Clothing' includes both cloth-type material clothing of the type that is typically worn by a human, as well as shoes and accessory items such as hair clips and jewelry etc.

'Detector' includes any form of detector capable of detecting acoustic energy. Typical detectors include conventional microphones. Alternatively, laser-type vibration sensors are known in the art for detection of acoustic energy, and may comprise in their simplest form a laser beam and a Doppler vibration sensor configuration, the laser beam being displaced relative to the vibration of the targets from insonification by the acoustic energy from the transmitter. In preferred embodiments, each acoustic energy detector may be considered a compound detector comprising a cluster of spatially separated detectors (e.g. microphones or laser-vibrations sensors). By using such compound detectors many aspects of signal detection and processing can be enhanced, including for example improved signal-to-noise ratio, detection of the directivity of an acoustic energy beam, and improved sampling of acoustic energy during the scanning process.

'Portal' includes any non-limiting form of opening of sufficient size for passage therethrough of a human subject. The opening may take the form of a hole within a frame, or may be a gap defined by wall members, to provide a gateway. The term 'portal' also encompasses a tunnel or archway. Generally, a portal defines an opening for access into a secure area.

'Remote' pertains to a lack of physical contact. The portal detection system of the present invention permits detection and possible characterization of an object hidden beneath the clothing of a human subject without any physical contact with the subject or his/her clothing. Therefore, the term 'remote' in accordance with the present invention includes a degree of separation between the human subject and the portal, although the distance of separation may be small.

'Scan profile' pertains to an overall scan of the various surfaces of a human subject for concealed objects. The scan profile represents a picture of the reflective/refractive and other acoustic properties of the human subject, for comparison with a database of known scan profiles characteristic of human subjects having objects concealed beneath clothing, or otherwise.

'Simple scan profile' pertains to a scan profile for providing an indication as to the presence or absence of one or more objects concealed beneath the clothing of a human subject (i.e. a simple scan profile is generated for providing a "YES/NO" answer).

'Complex scan profile' pertains to a scan profile for providing an indication as to the presence or the absence of one or more objects concealed beneath the clothing of a human subject, and also provides an indication as to the location of the one or more objects upon the human subject if present.

'Groups' of transmitters and receivers pertains to separate groups of transmitters and receivers within an array, adapted for scanning specific regions of the surface of the human subject. For example, an array may be configured to generally scan the front surfaces of a human subject, and the array may be divided into individual groups of transmitters and receivers each scanning a specific region of the front surfaces of the human subject. The concept of groups may be further applied to embodiments of the invention that include moveable transmitters and receivers, where each group scans specific portions of the human subject, and may continue to scan adjacent regions as the human subject continues to move through the portal. 'Transmitter' pertains to any form of transmitter capable of transmitting acoustic energy. Typical transmitters may take the form of conventional loud speakers.

DETAILED DESCRIPTION OF THE PREFERRED EMBODIMENTS

The portal detection systems and methods of the present invention allow for rapid, efficient and accurate detection of non-clothing objects that are concealed beneath the clothing of a human subject. Moreover, the portal detection systems and methods may be configured to detect either metallic or non-metallic objects. In a more preferred embodiment, the systems and methods of the present invention permit detection and location of the object upon the human subject, and in a most preferred embodiment the systems and methods further provide for identification of the material substance of the object.

The portal detection systems and methods of the present invention will be described with specific reference to embodiments that are intended for use in airport security. However, it will be understood that the systems and methods of the present invention may be applied to any scenario that requires detection of objects concealed beneath clothing. Such scenarios may include, but are not limited to, security systems for buildings, such as prisons, schools, hospitals etc. The systems and methods described are particularly suited to situations requiring rapid, thorough and non-invasive security screening of large numbers of human subjects.

The portal detection system of the present invention involves analysis of the reflection and refraction of acoustic energy, in accordance with the teachings of the applicant's previous U.S. Pat. No. 4,922,467, issued May 1, 1990, and International Patent Publication WO 02/068994, published Sep. 6, 2002, which are incorporated herein by reference. However, it is important to note that there are several important differences and additions between the applicant's previous disclosures, and the portal detection system described herein, as will be apparent from the present disclosure. Firstly, the portal detection system of the present invention, in its basic form, is principally designed for remote object detection and location, rather than for material classification. Secondly, the portal detection system of the present invention is specifically configured for human analysis; and is preferably configured for comprehensive scanning of the entire surface of a human subject under continuous motion. Moreover, in preferred forms the present application teaches systems and methods that permit rapid, remote, and non-invasive analysis of human subjects using 'arrays' of acoustic transmitters and detectors. Unexpectedly, the inventors have determined that constructing the portal with arrays of multiple transmitters and receivers presents particular advantages. Specifically, the multiple transmitters and receivers can function synergistically to provide an accurate and detailed 'picture' of surface anomalies of each human subject, thereby identifying the presence and location of illicit objects with minimal calculation.

Figure 1B:
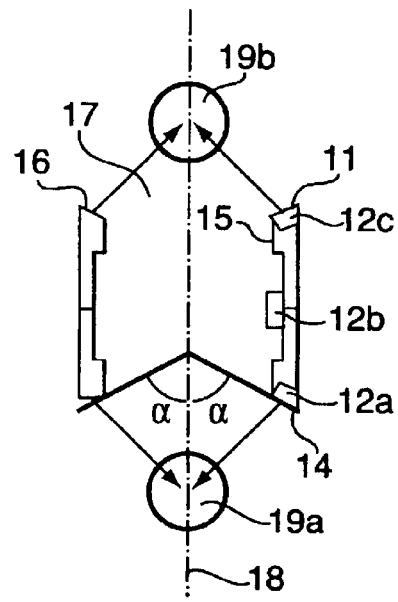
FIG. 1b illustrates a plan view of the first embodiment of the present invention.
Figure 1C:
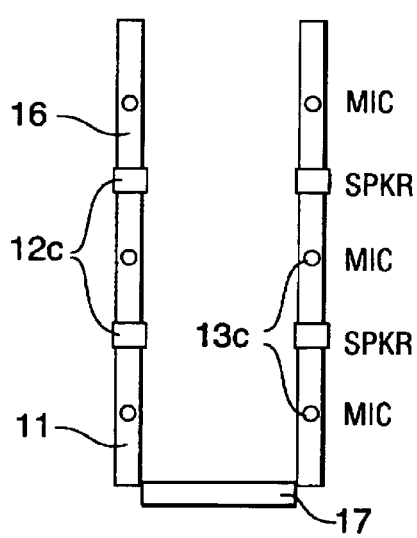
FIG. 1c illustrates a rear view of the first embodiment of the present invention.

An example portal design is illustrated in FIG. 1a (front view), FIG. 1b (plan view), and FIG. 1c (rear view). The portal is generally indicated by reference numeral 10, and includes a frame 11 of sufficient size for a human subject to move through the portal by walking or an alternative means of motion. A plurality of acoustic energy transmitters 12 (e.g. speakers), and a plurality of acoustic energy detectors 13 (e.g. microphones) are mounted on the frame 11. Any form of acoustic transmitters or receivers would be suitable for use with the portal of the present invention. Conventional acoustic speakers and microphones would be suitable, although specific circumstances may call for more specialized acoustic equipment. For example, the microphones can be substituted by alternative detection means including, but not limited to, laser displacement detection means, or vibration sensors.

The portal detection system shown in FIG. 1 includes three separate arrays of acoustic energy transmitters 12a, 12b, 12c, and three corresponding arrays of acoustic energy detectors 13a, 13b, 13c. The first array of acoustic energy detectors 12a and acoustic energy detectors 13a are positioned on a front side 14 of the frame 11. In this way, the first array of acoustic energy detectors transmit acoustic energy away from the front side the portal towards the front side of a human subject moving towards the portal. At this time, a array of the acoustic energy transmitted from the first array of acoustic energy transmitters will be reflected/refracted by the front surfaces of the human subject (and an object if present), back towards the front side 14 of the portal, and detected by the first array of acoustic energy detectors 13a.

A second array of acoustic energy transmitters 12b and acoustic energy detectors 13b are mounted upon an inner surface 15 the frame 11 of the portal. The second array of acoustic energy transmitters 12b are oriented to direct acoustic energy into a region immediately adjacent to and within the entryway of the portal. As the human subject continues to move into and through the entryway of the portal, the second array of acoustic energy transmitters direct acoustic energy towards the side surfaces of the human subject moving through the portal. At this time, the acoustic energy transmitted from the second array of acoustic energy transmitters will be reflected/refracted by the side surfaces of the human subject, back towards the inner surface 15 of the portal, and detected by the second array of acoustic energy detectors 13b.

A third array of acoustic energy transmitters 12c and acoustic energy detectors 13c are mounted upon a rear surface 16 of the frame 11 of the portal. The third array of acoustic energy transmitters 12c are oriented to direct acoustic energy away from the rear side 16 the portal. As the human subject continues to move out of the entryway of the portal and away from the portal's rear side, the third array of acoustic energy transmitters direct acoustic energy towards the back surfaces of the human subject. At this time, a array of the acoustic energy transmitted from the third array of acoustic energy transmitters will be reflected/refracted by the back surfaces of the human subject, towards the rear surface 16 of the portal for detection by the third array of acoustic energy detectors 13c.

In summary, the portal illustrated in FIG. 1 includes three principle arrays of acoustic energy transmitters and detectors, wherein each array is oriented to scan different areas of the human subject during passage through the portal. However, the portal of the present invention is not limited in this regard, and may include more than three arrays of transmitters and detectors, each oriented to scan a different array of the human subject. For example, the portal illustrated in FIG. 1 includes three main surfaces (front, inner, and rear) to which various arrays of transmitters and detectors are mounted. In alternative embodiments, the portal could include more than three surfaces, or an accurate surface, for mounting transmitters and detectors thereto. In this way, each transmitter or detector could be oriented at a slightly different angle relative to the direction of motion of the human subject, thereby helping to avoid the possibility of any 'blind-spots' that are hidden from the portal detection system during the scanning procedure. However, the inventor has determined that the provision of transmitters and receivers on front, inner and rear surfaces of the portal is generally sufficient for accurate object detection under most operating conditions.

In the embodiment illustrated in FIG. 1, the acoustic energy transmitters and detectors are regularly spaced about the frame, although many alternative configurations of transmitters and detectors can be used to achieve similar results. Indeed, one acoustic transmitter and one acoustic receiver may be sufficient to scan the surfaces of the human subject, particularly if the single transmitter and receiver may be moved and oriented about the human subject to ensure proper scanning coverage. However, the inventors have unexpectedly found that the inclusion of multiple transmitters and detectors provides unexpected enhancements to the speed and accuracy of object detection and location. Without wishing to be bound by theory, the provision of multiple transmitters and detectors, which may simultaneously or sequentially scan the surface of the human subject, may act in co-operation to provide synergistic improvements in object analysis. These aspects are discussed in greater detail below.

A preferred aspect of the invention is also illustrated in FIG. 1. The portal may include shoe scanning means 17 for scanning the shoes of the human subject for illicit materials. The shoe scanning means preferably comprises one or more acoustic energy transmitters, and one or more acoustic energy sensors, for scanning the material of the human subject's shoes. This scanning mechanism is generally in accordance with that previously described for general scanning of the human subject. Preferably, the shoe scanning means 17 is mounted either upon a lower array of the inner surface of the frame (as shown in FIG. 1). Alternatively the shoe scanning may be mounted integrally with a floor plate located at the base of the aperture in the portal. In a more preferred embodiment, the shoe scanning means is integral with a floor plate comprised of a material of similar consistency and density to typical shoe sole materials. In this way, the shoe scanning means an direct acoustic energy from the floor plate and into each shoe of the human subject, and the acoustic energy will undergo minimal reflection/refraction by the interface between the floor plate and the sole of each shoe. Without wishing to be bound by theory, this particular feature of the shoe scanning means is expected to improve acoustic coupling from differences in the material properties of the floor plate and the lower layers of the shoes.

In any event, the shoe scanning means may require alternative optimization compared to the other acoustic transmitters and detectors. For example, the shoe scanning means will be required to scan shoes, which generally comprise an alternative density and construction of material than other forms of clothing. For this reason, the orientation of the transmitters/detectors, and the intensity and frequency of the acoustic energy may need to be altered relative to the other transmitters and detectors.

Another preferred aspect of the invention is also illustrated in FIG. 1. This aspect pertains to the angled mounting of the first and third arrays of acoustic transmitters and detectors relative to the main axis of the portal. As illustrated in FIG. 1b, the first and second arrays of transmitters and detectors are mounted at an angle α, relative to the main axis 18 of the portal. In this way, acoustic energy emanating from the transmitters 12a and 12b will tend to converge in a regions 19a and 19b respectively. Without wishing to be bound by theory, it is likely that the angled arrangement of the transmitters 12a and 12b will improve the quality of scanning of the human subject, since the subject will unavoidably pass through regions 19a and 19b during passage towards, through and beyond the portal along the general line of main axis 18.

As the human subject approaches the front side 14 of the frame 11 the corresponding array of transmitters and detectors preferably scans the front surfaces of the human subject multiple times. In this case, it is expected that the intensity of the reflected/refracted acoustic signals may reach a peak as the subject passes through region 19a, since this position represents the location along main axis 18 where the acoustic energy is transmitted directly at the subject from transmitters 12a. As the human subject continues to move into the entrance of the portal, the intensity of the acoustic signals detected by the detectors 13a may begin to wane. Similarly, as the human subject exits the portal and continues away from the portal generally along main axis 18, the transmitters 12c on the rear side 16 may scan the back surfaces of the subject multiple times. The intensity of the acoustic signals detected by the detectors 13c may also reach a peak as the human subject passes directly in front of the acoustic transmitters 12c within region 19b. Similar though less obvious peak signals may also be observed for transmitters 12b and detectors 13b located on internal surface 15 of the frame 11, during scanning of the side portions of the human subject. In light of the above, the signal processor, in preferred embodiments, may select and process only the aforementioned peak acoustic signals, to generate the scan profile. In alternative embodiments the signal processor may process all of the signals received for each sampling time, and integrate all of this data to generate the scan profile. Preferably, the portal detection system is set up to establish a range within which the human subject is scanned.

In another preferred aspect (not shown in FIG. 1), the portal may include tracking means for tracking motion of the human subject towards, through and away from the portal. In this way, the tracking means may be connected to each array of acoustic energy transmitters and receivers, and activate each array to 'follow' and maintain appropriate scanning contact with the moving human subject. The tracking means may involve any appropriate means for detecting motion of a human subject towards, through, and beyond the portal. Such means may include, but are not limited to, floor mounted sensors, light or laser sensors etc. as well as beam steering of the receiver detector array through the use of multiple spaced sensors.

Figure 2:
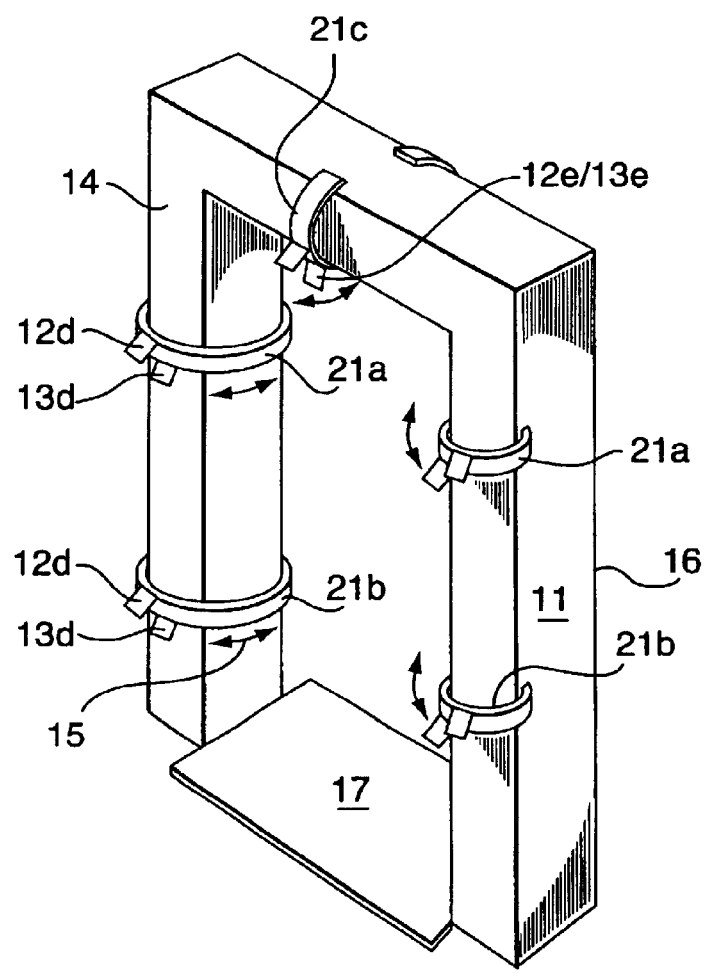
FIG. 2 illustrates a perspective view of the first embodiment of the present invention.

A second embodiment of the invention is shown in FIG. 2 (perspective view).

The second embodiment is very similar to the first embodiment (described with reference to FIG. 1) with the principle exception that the acoustic transmitters and detectors can move relative to the frame. For this purpose, the transmitters 12 and detectors 13 may be mounted to rotatable mountings 21, which themselves are pivotally mounted to the various parts of the frame 11. The embodiment illustrated in FIG. 2 provides for transmitters 12d and detectors 13d mounted to rotatable mountings 21a and 21b, which are themselves mounted to the vertical sections of the frame 11. In addition, the transmitters 12e and detectors 13e are mounted to rotatable mounting 21c, which itself is mounted to the upper horizontal section of the frame 11.

By rotatably mounting the transmitters and receivers upon the frame, the transmitters and receivers can be induced to move and effectively 'follow' the human subject during passage towards, through, and beyond the portal. In this way, the portal maintains scanning contact with the human at all stages, and allows all surfaces of the human subject to be analyzed to generate a comprehensive scan profile. In a preferred form, this type of portal may further include a tracking means, the tracking means monitoring progressive motion of the human subject towards, through and beyond the portal. Moreover, the tracking means may be connected to the transmitters and receivers for controlling motion thereof to maintain scanning contact with the human subject.

The portal of the type specified in FIG. 2 requires fewer transmitters and detectors than the portal design shown in FIG. 1. Moreover, the rotatable mounting permits the transmitters and detectors to be moved to a virtually infinite number of angles relative to the frame, and the human subject passing there through. This feature presents further advantages over the first embodiment of the invention, since multiple scans can be carried out at multiple angles, and each scan can be incorporated into the scan profile. It follows that the second embodiment may provide improved accuracy and reliability of object detection.

The embodiments of the invention provided in FIGS. 1 and 2 illustrate the portal as a rectangular frame defining a rectangular aperture. Whilst this configuration is amenable to portal construction, any portal shape would be suitable, providing the human subject is directed within range of the acoustic energy transmitters and receivers during passage through the portal. In fact, the portal need not define an aperture, but instead could involve a channel or gate including a gap defined by walls or posts for passage of the human subject there between.

Calibration Correction

In preferred embodiments of the invention, the data acquired by the detectors undergoes calibration correction as the first steps of signal processing. The calibration corrections improve the quality of each scan profile, thereby enhancing the capacity of the system to properly differentiate between the presence or absence of an object.

Preferably, the calibration corrections include two principle steps. Firstly, the signals acquired by the detectors are modified to allow to noise, and identify the signal component caused by the presence of an object (concealed beneath the clothing of the human subject). This is accomplished by determining an average noise level calculated by averaging a number of signals in the absence of an object, and subtracting the average noise level from the signals acquired when an object is present. Preferably, the average noise level is recalculated each time a data acquisition parameter (e.g. amplifier gain, sampling rate etc.) is changed.

The second calibration step involves correction for the energy factor to compensate for the overall source level and detector amplifier gain fluctuations. This can be accomplished by measuring and computing the respective terms in the sonar equation, shown below as equation 5 with the use of a calibration receiver in place of the target:

$$S = SL - N_W + DI + N_R + N_A + N_{PA} \qquad (5)$$

Where:
S=Signal received by detector
SL=Source level
$N_W$=Transmission loss

DI=Directivity index (beam pattern correction treated as a constant)
N$_R$=Detector sensitivity
N$_A$=Amplifier gain/loss
N$_{PA}$=Preamp gain/loss.

By deriving a correction factor based upon equation 1, the system can more accurately determine the presence or absence of a target upon the human subject in a repeatable manner.

Systems Configurations for Basic Object Detection

As previously mentioned, the portal detection system of the present invention may be used simply to detect the presence (or absence) of a non-clothing object concealed beneath the clothing of a human subject. This "YES/NO" type of object detection may be achieved by relatively simple scanning and computation techniques. For example, uniform pulses of acoustic energy can be emitted from all of the transmitters of an array of transmitters simultaneously (see FIG. 1).

These pulses of acoustic energy will be reflected/refracted from the human subject, and the concealed object(s) if present. As a result, the detectors in the array will detect a picture of the 'total' reflected/refracted acoustic energy. This may be sufficient for the signal processor to generate a simple scan profile for adequate determination of the presence or absence of a concealed object. However, since the round trip propagation time to the target is so short (in the order milliseconds), sequential transmission of acoustic pulses makes the processing easier as the noise levels are reduced and the processing simpler.

With regard to the signal processor, the inventor has also determined that preliminary calculations are generally sufficient to generate a simple scan profile. In fact, calculation of impedance (reflection coefficients), or absorption characteristics alone may be sufficient to determine the presence or absence of an object (see Examples for further information in this regard).

System Configurations for Identification of Object Location

In preferred embodiments, the portal detection system can detect and locate the position of an object upon the human subject. In one embodiment, this can involve the transmission of time sequential pulses of acoustic energy from different of acoustic energy transmitters, or groups of acoustic energy transmitters. For example, the transmitters positioned on a lower portion of the portal can be programmed to transmit pulses of acoustic energy at different times compared to the transmitters positioned on an upper portion of the portal. As usual, the acoustic signals are reflected by the human subject and the object (if present), and are subsequently detected by each detector in the array. However, the signals originating from the lower transmitters and the upper transmitters are temporally separated, and thus suitably differentiated by the signal processor. It follows that the signal processor can effectively generate a first scan profile for the lower portion of the human subject, and second scan profile for the upper portion of the human subject, thereby permitting separate analysis of different portions of the human subject. The first and second scan profiles can be combined to generate an overall 'complex' scan profile for the human subject.

In further corresponding embodiments, the portal detection system of the present invention can be further modified for even more accurate location of the concealed object. Rather than separately controlling the initiation of "upper" and "lower" portions of the transmitters on the portal, each array of transmitters and detectors can be differentiated into multiple 'groups' of transmitters and detectors, each group of each array being separately controlled to scan a specific region (e.g. lower legs, upper chest etc.) of the body of the human subject. This concept can be readily applied to any portal detection system, irrespective of the arrangement of the arrays. Moreover, the concept can also be applied to embodiments of the invention comprising moveable arrays of detectors and receivers. In any event, each group of transmitters and detectors in each array can generate a separate scan profile for the specific region of the body of the human subject, and if required the various scan profiles can be combined to generate a complex scan profile. In addition, each scan profile can be compared to known scan profiles to determine a presence or absence of a concealed object upon each part of the human subject.

It is also important to note that each array of transmitters and detectors, or each group of transmitters and detectors, can be differentiated by ways other than temporal differentiation. For example, each group or each array of transmitters may generate acoustic energy of a different signal characteristics relative to the other groups/arrays of acoustic energy transmitters. Following reflection/refraction and detection of this acoustic energy by the detectors, the signal processor will subsequently differentiate the received acoustic signals according to these characteristics, and thereby determine the source transmitter for each signal. In effect, each region of the human subject may be scanned separately to generate an independent scan profile corresponding to the region being scanned.

The present invention further encompasses the use of alternative means for determining the location of an object upon the human subject. These alternative means include calculation of the relative distances of the object from each detector in an array. For example, a selected acoustic energy transmitter in an array may transmit acoustic energy at the concealed object. The object will subsequently reflect/refract the acoustic energy in multiple directions, and several detectors in the array may detect the reflected/refracted acoustic energy. Depending upon the location of the detectors, and their distance from the object, the reflected/refracted acoustic energy may be detected by each detector at different times. Therefore, assuming a point source of reflection/refraction, the location of the object can be determined.

These calculations may involve triangulation. Alternatively the distance of the object from each detector may be considered as a sphere having a specific radial size equal to the calculated distance of the detector from the object. As a descriptive example, it follows that the point of intersection of three or more spheres will indicate the position of the object at a specific time relative to the portal. The point of intersection of the three spheres may be calculated according to equations 1, 2, and 3:

$$(x-x_1)^2+(y-y_1)^2+(z-z_1)^2=R_1^2 \quad (1)$$

$$(x-x_2)^2+(y-y_2)^2+(z-z_2)^2=R_2^2 \quad (2)$$

$$(x-x_3)^2+(y-y_3)^2+(z-z_3)^2=R_3^2 \quad (3)$$

where $(x_1, y_1, z_1)$, $(x_2, y_2, z_2)$ and $(x_3, y_3, z_3)$ are the co-ordinates in three dimensional space indicative of the locations of three detectors that are not in a straight line, and detecting the acoustic signals. $R_1$, $R_2$, and $R_3$ are the radii of the spheres as determined by the signal processor. Additional detectors can be used to further improve the accuracy of the objection location calculations.

System Configurations for Identification of Object Material Substance

Most preferably, the portal detection system has the capacity to determine not only the presence of the object(s), but also the material substance of the object(s). For this purpose, additional calculations may be required by the signal processor (and other components of the operating system) to generate an 'object signature' characteristic of the material substance of the object. For example, the object signature may comprise various properties of the object as determined by the acoustic analysis. These acoustic properties may be selected from the non-limiting group including impedance (reflection coefficient), velocity, absorption, a rate of change of absorption as a function of frequency etc. Further information regarding the use of acoustic energy for material substance characterization may be found in the applicant's previous U.S. Pat. No. 4,922,467, issued May 1, 1990, and International Patent Publication WO 02/068994, published Sep. 6, 2002.

Consideration of Different Types of Clothing

Most preferably, the portal detection system of the present invention is adapted to compensate for different types of clothing, regardless of whether the portal detection system is intended for basic object detection, object location or object material classification.

For example, some types of clothing may be thin and have little impact upon the acoustic energy. In this way, the acoustic energy may readily penetrate through the clothing to the body of the human subject, and the concealed object if present.

However, other types of clothing may be thicker, and represent a significant barrier to transmission of the acoustic energy. As a result, only a small proportion of the incident acoustic energy may penetrate deep enough to encounter the concealed object, and be reflected/refracted thereby.

Further considerations include layered clothing, which may represent multiple interfaces for reflection and/or refraction of the incident acoustic energy from the transmitter, thereby generating unwanted signals that are not relevant to object detection.

Such factors may be important in the analysis of the acoustic energy signals by the signal processor. Calculations by the signal processor may take into account the effects of thicker clothing or layered clothing upon the acoustic signals received by the detector. For example, the signal processor may process all of the acoustic signals, or portion(s) thereof, over a specific sampling period, and differentiate those signals originating from the layer or layers of interest, which may include the concealed object. Such considerations and calculations may be conducted in accordance with the teachings of U.S. Pat. No. 4,922,467, issued May 1, 1990, and International Patent Publication WO 02/068994, published Sep. 6, 2002, and references cited therein. Further consideration of clothing types is also provided in Examples 5 and 6 below.

Detection of Objects Concealed Beneath the Skin of a Human Subject

As mentioned above, the portal detection system of the present invention, at least in preferred embodiments, may differentiate between layers of clothing and the concealed object. In other preferred embodiments the portal detection may have the alternative or additional capacity to detect and/or locate the object when concealed beneath the skin of the human subject. In this respect, the methods and systems of the present invention are not limited to detection of objects concealed by clothing, and may be readily applied to other means of concealment, including concealment beneath skin. Although the acoustic properties of the skin may differ from most items of clothing, the same acoustic system and methods can be applied. Hence there is also provided a portal detection system for remote detection of an object concealed beneath the skin of a human subject, the portal comprising: one or more acoustic energy transmitters for generating acoustic energy and directing the acoustic energy towards the human subject; one or more acoustic energy detectors for detecting acoustic energy reflected and/or refracted from the human subject, to generate acoustic energy signals; signal processor means for processing the acoustic energy signals to generate one or more scan profiles of the human subject; comparator means for comparing the scan profile with known scan profiles to detect a presence of the object beneath the skin. Preferably, the signal processor and the comparator means enable differentiation between each layer of skin and/or clothing to determine the layer comprising the object.

Databases of Scan Profiles

In any event, the accuracy of detection and/or material classification will depend in part upon the size and accuracy of the pre-stored database of known scan profiles. For example, when the portal simply detects the presence/absence of an object, the signal processor will utilize the various acoustic signals that compose the scan profile, and compare the scan profile to known scan profiles pre-stored in the database. These preferably include scan profiles for various types of human subjects in various types of clothing. One portion of the database may comprise scan profiles for human subjects covered only by clothing, and lacking any concealed objects. Another portion of the database may comprise known scan profiles for human subjects concealing various types and sizes of objects beneath their clothing in various locations. Therefore, by direct comparison of each new scan profile with the database of known scan profiles, the portal detection system may determine the presence or absence of one or more concealed objects. The concept of the database can be extended to material substance classification.

Example System Configurations

Figure 3A:
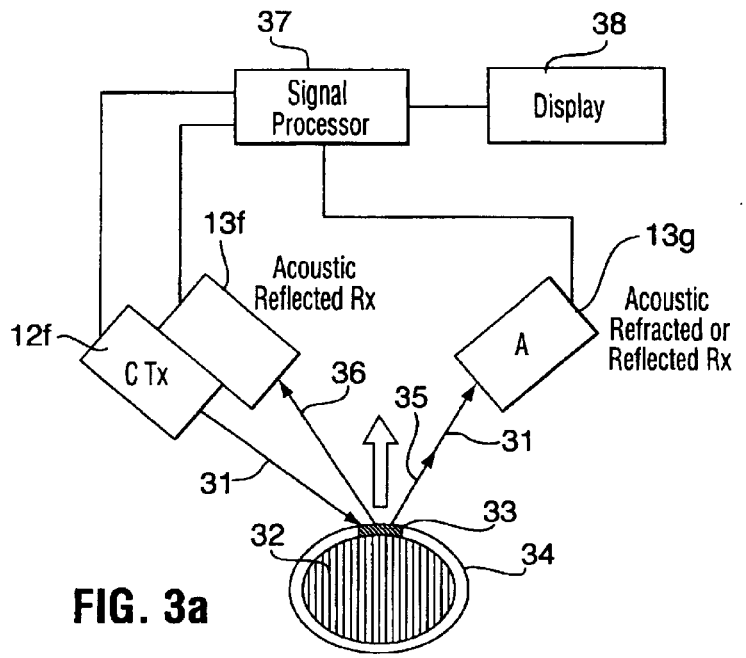
FIG. 3a illustrates a schematic overview of the arrangement of an acoustic energy transmitter and acoustic energy detectors for detected an object concealed beneath the clothing of a human subject.
Figure 3B:
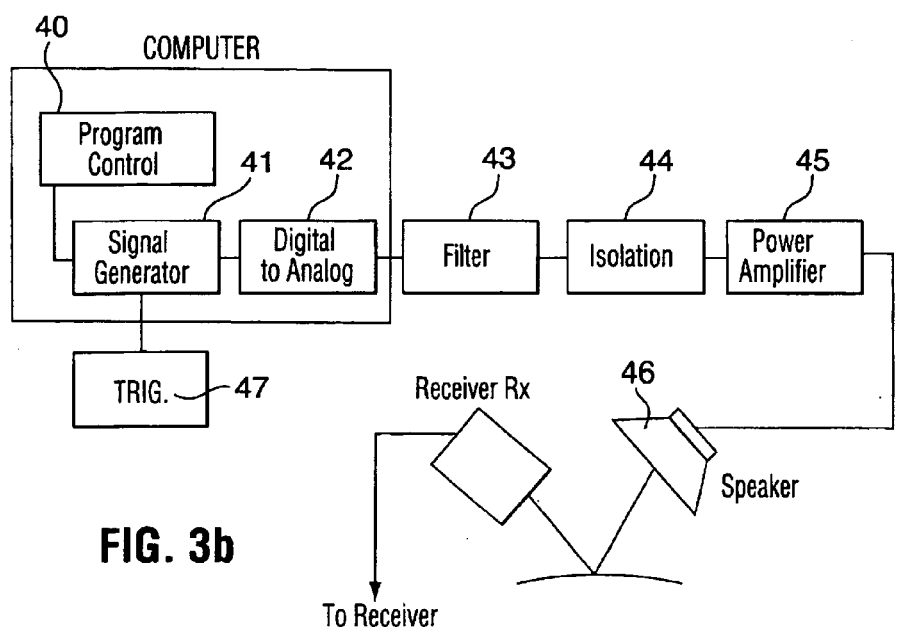
FIG. 3b illustrates an example of an acoustic transmitter arrangement for use with a portal detection system of the present invention.
Figure 3C:
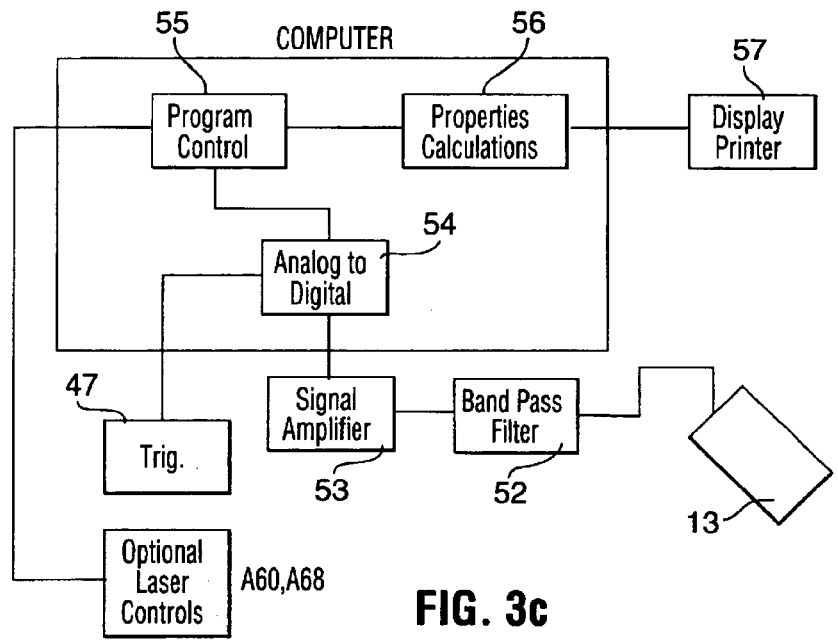
FIG. 3c illustrates an example of an acoustic detector arrangement for use with a portal detection system of the present invention.

FIGS. 3a, 3b, and 3c illustrate a typical system for use in conjunction with the portal detection system of the present invention. The system shown in FIG. 3 is not intended to detract from the inventive features of the portal, but simply to provides an example of the type of system that would be appropriate for portal operation.

FIG. 3a provides a general overview of the acoustic energy transmitter and receiver systems, and their position relative to the human subject and concealed object. The human subject (in cross-section) is indicated by 32, covered by clothing 34. An object 33 is held adjacent the human subject 32 beneath the layer of clothing 34, and thereby the object 33 is concealed from view. The human subject moves towards the portal (not shown) in the general direction indicated by the large arrow. Acoustic energy transmitter 12f transmits acoustic energy 31 towards the human subject 32 and the object 33 concealed beneath the clothing 34. A portion of the acoustic energy 31 is reflected 36 by the object 33 and detected by an appropriately positioned acoustic energy detector 13f. In addition, another portion of the acoustic energy 31 is refracted 35 by the object 33 and detected by another acoustic energy detector 13g. The acoustic energy transmitter 12f, and the two acoustic energy detectors 13f, 13g are each connected to signal processor 37. The signal processor 37 process information derived from the transmitter and detectors to detect a present of the object, and/or a position of the object, and/or a material substance of the object, in accordance with the present invention. The result of the signal process may be displayed on the display 38, for review by the portal operator.

FIG. 3*b* illustrates an example system for source signal generation from the one or more acoustic energy transmitters. The program control 40 may be used to select whether data processing or data acquisition is performed. For example, the receipt of an appropriate signal from a human subject detection means or tracking means may indicate the presence of a person starting to proceed towards the portal. The program control 40 initiates the signal generator 41. The signal generator 41 recalls from memory a digitally stored wavelet, which is fed to the digital to analog output circuitry 42. Typically, a single cycle pulse may be used, although other pulses such as chirp and random noise may also be suitable for application to the present invention. The particular target, and clothes may determine the final selection of the signal type for system optimization.

A filter 43 may optionally be included to smooth the analog output waveform, particularly since the signal was generated by a finite number of samples. For example, the filter may involve standard resistor/capacitor components. The system may further include an isolator 44 to ensure proper reference to ground, proper level control, and any preamplifier functions. The system further includes a power amplifier 45, which provides the necessary wattage to drive the speaker 46 at the desired source level. Moreover, the speaker 46 is selected to fit the desired mechanical configuration of the portal, the beam pattern, and the desired frequency response and source level requirements. Importantly, the output wavelet and source level may be calibrated with a precision calibration microphone and amplifier, to allow for precise computation of the object detection and material classification algorithms.

Preferably, the system illustrated in FIG. 3*b* further includes a timing device 47, connected to both the transmitter and detector systems, for activating these systems for a specific time period following the initial detection of the presence of the human subject.

The inventors have determined that almost any frequency of acoustic energy may be transmitted by the acoustic energy transmitter(s) within the desired time and desired spatial resolution, and employed in accordance with the teachings of the present invention. However, for the analysis of objects beneath clothing, the inventors have determined that optimal results can be achieved using acoustic energy frequencies of between 10 KHz and 25 KHZ, most preferably about 16 KHz.

An example configuration for an acoustic energy detector for the portal is illustrated in FIG. 3*c*. As mentioned previously, the acoustic energy detector may take the form of a conventional microphone arrangement, or other systems such as a laser-type vibration detector. Such laser-type vibration sensors are known in the art, and may comprise in their simplest form a laser beam and a Doppler vibration sensor configuration, the laser beam being displaced relative to the vibration of the targets from insonification by the acoustic energy from the transmitter.

The signal received by the detector may be passed through a band pass filter 52 to optimize the signal-to-noise ratio by eliminating noise outside of the operating bandwidth. Typically, the band width filter may exclude frequencies of less than about 10 KHz or more than about 25 KHz. Subsequently, the filtered signal is amplified by signal amplifier 53 of known gain characteristics to match the dynamic range of the analog to digital converter 54. The analog to digital converter converts the received analog signal to digital format for processing by the computer. The number of bits representing the signal are chosen for the required accuracy and speed of the system. The analog to digital sampling frequency should preferably be well above the Nyquist sampling frequency. The system may also include the timing device 47 connected to both transmitter and detector circuitry for activating the portal for a specific time period following the initial detection of the presence of the human subject.

The digital signal(s) are forwarded to the program control 55, which stores and formats the data for subsequent properties calculations 56. Such calculations include, but are not limited to, calculation of the impedance (reflection coefficients), velocity, absorption, rate of change of absorption as a function of frequency etc. of the various target layers, to determine whether any illicit objects are concealed beneath the clothes. The results of the calculations may be displayed on the display 57, which may take the form of a screen or printer etc.

The invention will be further described with reference to the following non-limiting examples:

EXAMPLE 1

Calculation of Reflection Coefficients (Impedance) is Sufficient for Detection of the Presence of Explosive Sheets A prototype model of the portal detection system was utilized to test the capacity of the system to differentiate between a human wearing a shirt, and a human wearing a shirt, and concealing two types of simulated explosive materials beneath the shirt. For this purpose, acoustic energy was directed towards the human subject at a distance of 70 cm. The acoustic signals detected by the acoustic detector(s) were utilized to calculate an impedance value for the layer prior to the reflecting surface, and the reflecting layer. These values permitted calculation of the corresponding reflection coefficients in accordance with equation 4:

$$R=(Z1-Z2)/(Z1+Z2) \qquad (4)$$

where

R=reflection coefficient (db)

Z1=impedance of the layer prior to the reflecting layer

Z2=impedance of the reflection layer.

Figure 4:
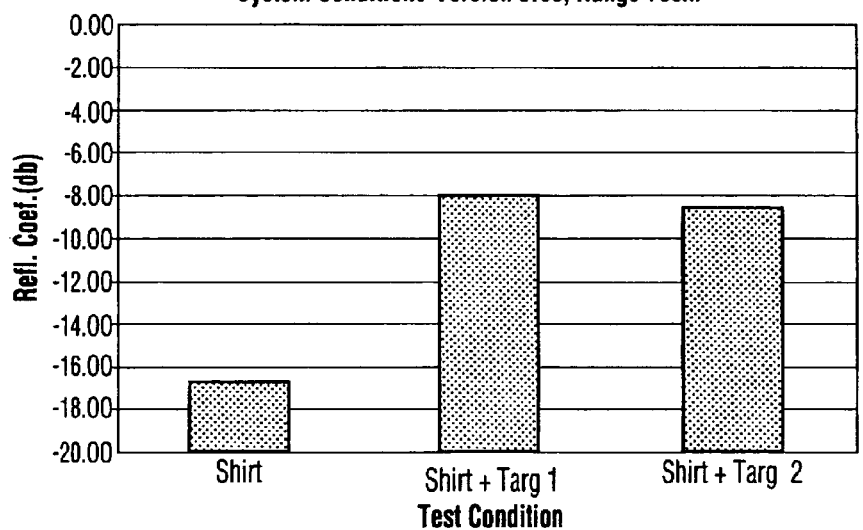
FIG. 4 illustrates the results of a comparative experiment to assess the capacity of a portal detection system to differentiate between a human subject wearing a shirt, and a human subject concealing two types of plastic sheeting beneath a shirt, by calculation of impedance values (reflection coefficients).

The comparative results of the experiment are shown in FIG. 4 where the reflection coefficient is provided in decibels (db). The results indicate a clear distinction in the value of the reflection coefficient for the human subject covered only by a shirt, and the inclusion of a simulated sheet of plastic explosive material and a simulated small container of explosive material.

EXAMPLE 2

Calculation of Absorption is Sufficient for Detection of the Presence of Explosive Sheets The prototype model of the portal detection system was further utilized to conduct a similar experiment to that shown in Example 1, with an alternative method of acoustic analysis. For this purpose, acoustic energy of more than one frequency was directed towards the human subject at a distance of 70 cm. The resulting acoustic signals detected by the acoustic detector(s) were utilized to calculate a value for a rate of change of absorption with respect to frequency, either of the human subject or the human subject with two types of simulated explosives beneath clothing, in accordance with equation 2.

$$dS/df = \text{function}(dA/df, d\alpha/df) \quad (2)$$

Where
S=The detected acoustic energy amplitude
A=The transmitted source energy amplitude.
α=The absorption of the human subject and concealed object (if present)
f=Acoustic energy frequency.

Figure 5:
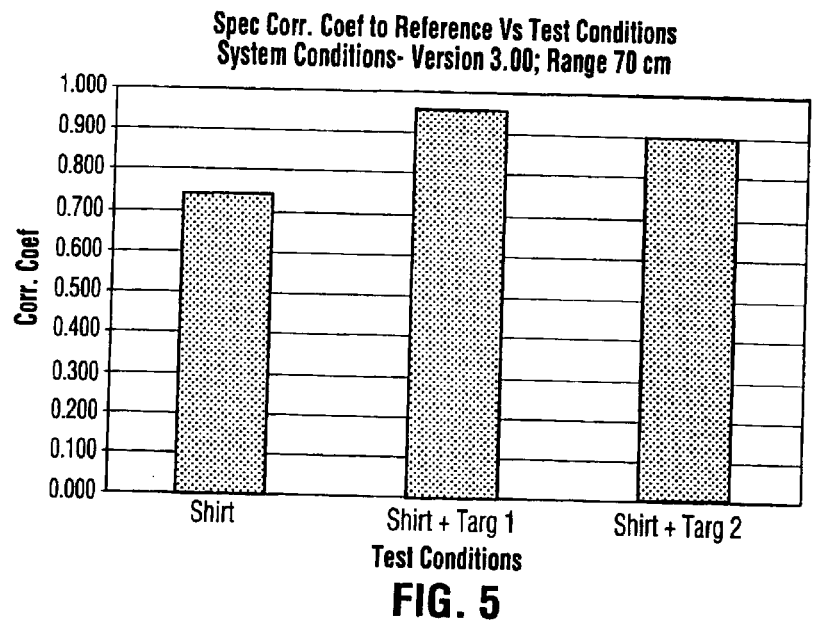
FIG. 5 illustrates the results of a comparative experiment to assess the capacity of a portal detection system to differentiate between a human subject wearing a shirt, and a human subject concealing two types of plastic sheeting beneath a shirt, by calculation of absorption deviation as a function of frequency using a correlation coefficient to represent the absorption effect. High correlations with the source calibration signal indicates little or no absorption, and low correlation with the source calibrated signal indicates high absorption. This correlation absorption technique is only one of many ways of examining absorption effects.

The comparative results of the experiment are shown in FIG. 5. The results indicate a distinction in the effects of dα/df for the human subject covered only by a shirt, and the same experiment with the human subject concealing plastic sheeting material beneath clothing. For this test the correlation coefficient of the acquired spectral data versus the calibrated source spectral data was used. A high correlation value generally indicates a low dα/df term, and conversely a low correlation value generally indicates a high dα/df term or value.

EXAMPLE 3

Calculation of Reflectivity (Db) is Sufficient for Detection of the Presence Of Explosive Sheets— Different Ranges The prototype model of the portal detection system was further utilized to conduct a similar experiment to that shown in Example 1, with an alternative method of acoustic analysis. For this purpose, the reflectivity of the target was calculated, with each target located a distance of 90 cm normal to the speaker/detector array, with the array mounted at 30 degrees from the main axis of the passageway of the portal, the width of the portal being 33.5 inches. The resulting acoustic signals detected by the acoustic detector (s) in the array were utilized to calculate a value for the reflectivity (db) of each target. The targets used included a nude human subject, a human subject covered with a shirt, and a human subject with two types of simulated explosives concealed beneath the shirt.

Figure 6:
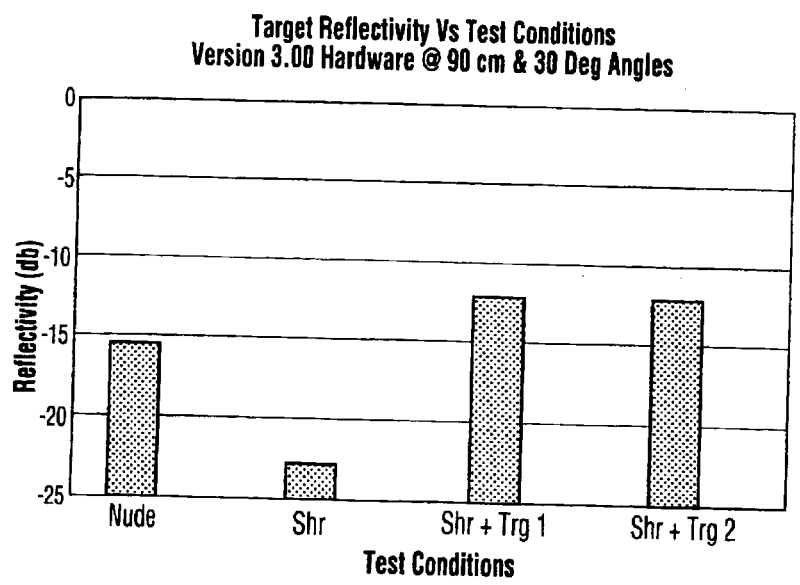
FIG. 6 illustrates the results of a comparative experiment to assess the capacity of a portal detection system to differentiate between a nude human subject, a human subject wearing a shirt, and a human subject concealing two types of plastic sheeting beneath a shirt, by reflectivity (db).

The results comparative results of the experiment are indicated in FIG. 6, and indicate clear discrimination between the human subject covered by a shirt, and the human subject concealing either object beneath the shirt. Some discrimination is also present between the reflectivity of the nude human subject, and the human subject concealing the objects beneath a shirt.

EXAMPLE 4

Further Reflectivity Experiments

Figure 7:
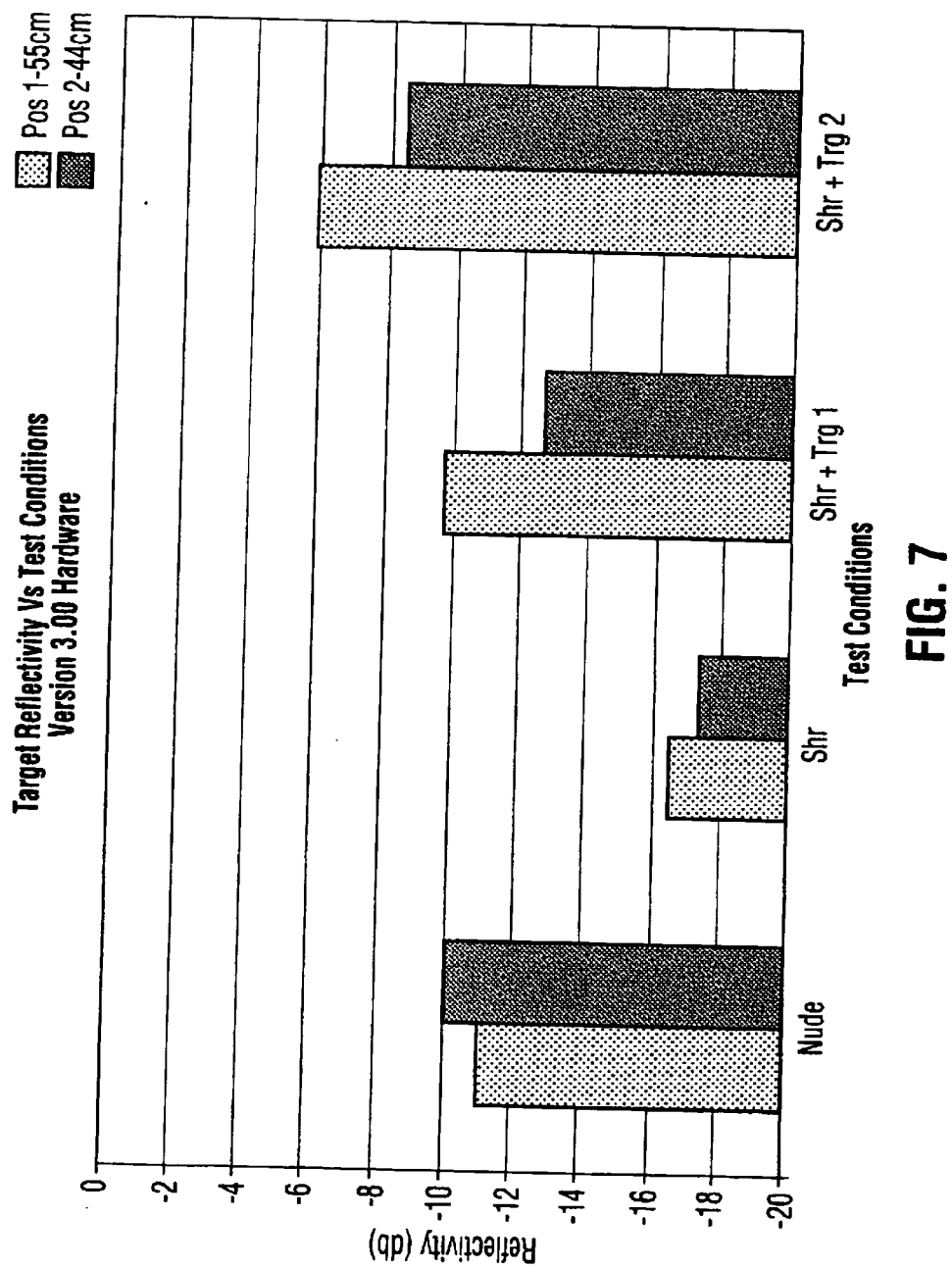
FIG. 7 illustrates the results of a comparative experiment to assess the capacity of a portal detection system to differentiate between a nude human subject, a human subject wearing a shirt, and a human subject concealing two types of plastic sheeting beneath a shirt, by reflectivity (db) at two different distances.

In accordance with Example 3, additional experiments were conducted with the various targets positioned 44 cm or 55 cm from the portal. The results shown in FIG. 7 compare the reflectivity of the various targets. As observed in FIG. 6, the portal detects the difference in reflectivity of the human subject covered only by a shirt, and the human subject having objects concealed beneath the shirt. Generally, the observed reflectivity was less when each object was placed closer to the portal (i.e. 44 cm rather than 55 cm). This difference in range effect is due to the angle of reflection at the target (reflection coefficient varies as the cosine of the angle at the target) and the beam pattern effects of the detector. Both are readily corrected for in a practical system.

EXAMPLE 5

Comparison of Acoustic Penetration of Different Types of Clothing Materials

The prototype portal detection system was configured to compare various types of clothing that might typically be worn by a human subject. In this regard, characterization of the propagation properties of human clothing is an important factor in successful operation of the systems and methods of the present invention.

The present series of experiments tested the capacity of a prototype portal to penetrate different types of clothing, to encounter a concealed object. For this purpose, the known object comprised extremely pressed wood. This object was also used as a backing for reflection studies, and for gross calibration of the acoustic system. Each clothing material was tested by draping the material in front of the object, so that the material hung approximately 30 cm from the surface of the pressed wood. An acoustic energy transmitter and an acoustic energy detector were mounted approximately 100 cm from the object, to focus upon the mid-point of the object at an angle of 30° from the normal. 16 KHz pulses of acoustic energy were transmitted towards the object, and the detector was triggered to sample incoming acoustic energy at 20 microsecond intervals (50 KHz sampling rate). For each pulse, the acoustic signals were recorded with a trace data sample length of 1400 points (28 milliseconds). The data was recorded in compressed SEG-Y 16 bit format. The detector has an estimated corresponding gain of −70 db, and the system gain was also approximately known. By assuming that the pressed wood was an almost perfect reflector, an estimated acoustic energy source level was computed. The estimated values for source levels, detector sensitivity, and system gain remained reasonably consistent during calibration, and these values were utilized for subsequent calculations.

Eight different material types were positioned between the object and the transmitter/detector combination, as previously described. Pulses of acoustic energy were directed to the object via each material type, in order to test the reflectivity of the material layer relative to the object layer. The results of the experiment are shown in Table 1. The values shown in Table 1 represent means values from multiple experiments.

TABLE 1

| Material | 1st Ref Ampl db | 2nd Ref Ampl db | Ratio A2/A1 db | Ratio Ampl. | BL db | Reflection Coef Mat. |
|---|---|---|---|---|---|---|
| Cot. Sheet | −7.0419 | 6.269567 | 13.31147 | 4.629998 | −24.188 | 0.061746 |
| Fln. Sheet | −1.913567 | 5.047167 | 6.960733 | 2.230366 | −19.37867 | 0.107517 |
| Quilt Jack 1 | −2.881567 | −4.123667 | −1.2421 | 0.867562 | −20.72467 | 0.092163 |
| Knit Sweat | −2.542733 | 2.186533 | 4.729267 | 1.724467 | −20.15267 | 0.098284 |
| Arctic Coat | 6.917533 | −10.57933 | −17.49687 | 0.133408 | −10.878 | 0.285913 |
| Lite Sweat | −1.425967 | 6.5089 | 7.934867 | 2.497282 | −19.319 | 0.108262 |

TABLE 1-continued

| Material | 1st Ref Ampl db | 2nd Ref Ampl db | Ratio A2/A1 db | Ratio Ampl. | BL db | Reflection Coef Mat. |
|---|---|---|---|---|---|---|
| Quilt jack 2 | 5.876433 | 1.482633 | −4.3938 | 0.603779 | −11.99967 | 0.251519 |
| Knit Blank. | −5.9548 | 14.309 | 20.2638 | 10.31004 | −23.67733 | 0.065495 |

Where:

Material=the material type under test $1^{st}$ Ref=the amplitude (db) of the first acoustic signal detected by the detector, which generally resulted from reflection of a transmitted pulse of acoustic energy by the material layer.

$2^{nd}$ Ref=the amplitude (db) of the second acoustic signal detected by the detector, which generally resulted from reflection of a transmitted pulse of acoustic energy by the object.

Ratio A2/A1=Decibel value of Ratio Amplitude=20*Log (Ratio Ampl.)

Ratio Ampl.=the ratio of the $2^{nd}$ Ref/$1^{st}$ Ref. Higher values indicate strong penetration of the acoustic signal(s) through the material under test, whereas lower values indicate low acoustic penetration.

BL=Reflection Coefficient in Decibels=20*Log(Refl. Coef.) or

=20*Log(Refl. Coef. Mat.)

Reflection Coef Mat.=the reflection coefficient of the material.

From a brief review of Table 1, it can be noted that the prototype system is able to determine that the most easily penetrable material was the cotton sheet, and the least penetrable material was the arctic coat (compare values in the column marked as 'Ratio Ampl.'). Nonetheless, the small second reflection ($2^{nd}$ Ref.) from the object beneath the arctic coat was still detectable above background noise. It should be noted that the ratio values that are used to determine acoustic penetration through a material do not exactly correlate with the values for reflection coefficients, due to differing degrees of acoustic energy absorption for each type of material.

EXAMPLE 6

Ability of a Portal Detection System to Detect an Object Concealed Beneath Clothing of a Human Subject.

A test human subject was instructed to walk towards and away from the prototype portal detection system, either with or without a test object concealed beneath their clothing. For these experiments, the object was a ⅛ inch thick hard pressed cardboard, approximately 10 inches square, and further including a layer of plastic on both sides. The experiment was repeated with the human subject clothed either in a tight weave cotton shirt, or a quilted jacket. Regardless of the clothing, the object was fully concealed beneath the clothing when present.

The data was acquired for multiple scans, and using the Acoustic Core™ calibration program. The average results of multiple experiments are indicated in Table 2. Table 2 includes values for received signal amplitude, bottom loss, and reflection coefficient for each human subject, in either form of clothing, with the presence or absence of the test object.

The data provided in Table 2 demonstrate the capacity of the prototype portal detection system to successfully differentiate between the presence and absence of the test object, regardless of the clothing type. It is also important to note that in the case of the quilted jacket (which has a lower reflection coefficient) it is evident during echo analysis that the jacket comprises multiple layers and reflection interfaces.

TABLE 2

| Material type | Object present? | Amplitude (db) | Bottom Loss | Reflection coefficient |
|---|---|---|---|---|
| Cotton shirt | No | 7.386567 | −10.48087 | 0.314967 |
| | Yes | 16.22667 | −1.9168 | 0.805767 |
| Quilt Jacket | No | 10.0328 | −7.756967 | 0.413033 |
| | Yes | 7.130567 | −10.45783 | 0.30068 |

While the invention has been described with reference to particular preferred embodiments thereof, it will be apparent to those skilled in the art upon a reading and understanding of the foregoing that numerous systems and methods, other than the specific embodiments illustrated are attainable, which nonetheless lie within the spirit and scope of the present invention. It is intended to include all such apparatuses and methods, and equivalents thereof within the scope of the appended claims.

What is claimed is:

1. A portal detection system for remote detection of an object concealed beneath clothing of a human subject, the portal detection system comprising:

one or more acoustic energy transmitters for generating acoustic energy and directing the acoustic energy towards the human subject;

one or more acoustic energy detectors for detecting acoustic energy reflected and/or refracted from the human subject, to generate acoustic energy signals;

signal processor means for processing the acoustic energy signals to generate one or more scan profiles of the human subject;

comparator means for comparing the scan profile with known scan profiles to detect a presence of said object.

2. The portal detection system according to claim 1, further comprising a frame defining a passage of a size sufficient for movement there through of the human subject, said one or more acoustic energy transmitters and said one or more acoustic energy detectors mounted to said frame.

3. The portal detection system according to claim 2, wherein said one or more acoustic energy transmitters comprises a plurality of acoustic energy transmitters for directing acoustic energy towards said human subject from more than one position on the fame.

4. The portal detection system according to claim 2, wherein said one or more acoustic energy detectors comprises a plurality of acoustic energy detectors for detecting acoustic energy reflected and/or refracted from said human subject from more than one position on the frame.

5. The portal detection system according to claim 2 comprising at least three arrays, each array mounted on the frame and comprising one or more acoustic energy transmitters and one or more acoustic energy detectors, wherein:

a first array is mounted on the frame to transmit and detect acoustic energy on a first side of the frame;

a second array is mounted to the frame to transmit and detect acoustic energy in a region within and directly adjacent to the frame; and a third array is mounted to the frame to transmit and detect acoustic energy on a second side of the frame.

6. The portal detection system according to claim 5, configured to scan a human subject moving through said portal from multiple angles, wherein:

said first array is oriented to scan front surfaces of said human subject upon approach and entry into the portal;

said second array is oriented to scan side surfaces of said human subject upon passage through the portal; and said third array is oriented to scan back surfaces of said human subject upon exit and movement away from the portal.

7. The portal detection system according to claim 6, said first array comprising two or more transmitters angled towards a main axis of the passage on said first side of said frame, whereby acoustic energy emanating directly from transmitters of said first array intersects said main axis on said first side of said frame.

8. The portal detection system according to claim 7, said first array scanning said human subject multiple times upon approaching the portal, the signal processor processing each resulting acoustic signal to determine a peak acoustic signal for the first array, said signal processor further processing said peak acoustic signal together with acoustic signals derived from the second and third arrays, to generate said scan profile.

9. The portal detection system according to claim 6, said third array comprising two or more transmitters angled towards a main axis of the passage on said second side of said frame, whereby acoustic energy emanating directly from transmitters of said third array intersects said main axis on said second side of said frame.

10. The portal detection system according to claim 9, said third array scanning said human subject multiple times upon exiting the portal, the signal processor processing each resulting acoustic signal to determine a second peak acoustic signal for the third array, said signal processor further processing said second peak acoustic signal together with acoustic signals derived from the first and second arrays, to generate said scan profile.

11. The portal according to claim 6, further including tracking means for tracking movement of said human subject towards, through and beyond said portal, said tracking means in communication with, and inducing activation, of each array of said one or more acoustic energy transmitters and said one or more acoustic energy detectors, to follow and maintain scanning contact with said human subject.

12. The portal detection system according to claim 11, wherein said tracking means is selected from the group consisting of: one or more floor pads, one or more light sensors, and one or more laser sensors.

13. The portal detection system according to claim 11, wherein said tracking means comprises said one or more acoustic energy transmitters and said one or more acoustic energy detectors.

14. The portal detection system according to claim 1, wherein said one or more acoustic energy transmitters are moveable about the portal to direct the acoustic energy towards said human subject from more than one angle.

15. The portal detection system according to claim 14, wherein said one or more acoustic energy detectors are moveable about the portal to detect acoustic energy reflected and/or refracted from the human subject from more than one angle.

16. The portal detection system according to claim 15, further comprising tracking means for tracking movement of said human subject towards, through and beyond said portal, said tracking means in communication with, and inducing movement of said one or more acoustic energy transmitters and said one or more acoustic energy detectors, to follow and maintain scanning contact with said human subject.

17. The portal detection system according to claim 16, wherein said tracking means is selected from the group consisting of: one or more floor pads, one or more light sensors, and one or more laser sensors.

18. The portal detection system according to claim 16, wherein said tracking means comprises said one or more acoustic energy transmitters and said one or more acoustic energy detectors.

19. The portal detection system according to claim 1, the portal comprising two or more groups of one or more acoustic energy transmitters and one or more corresponding acoustic energy detectors, each group of transmitters and detectors scanning a predetermined portion of the human subject during passage through the portal, the signal processor processing each acoustic signal derived from each group of transmitters and detectors, to generate a separate scan profile for each group indicative of each scanned portion of the human subject, the comparator means comparing each scan profile for each group with known scan profiles to determine a presence, and a location, of said object upon said human subject.

20. The portal detection system according to claim 19, wherein each group scans the human subject at a predetermined scan time, said signal processor differentiating each group according to each predetermined scan time.

21. The portal detection system according to claim 1, wherein each acoustic energy detector is a compound acoustic energy detector comprising a cluster of spatially separated acoustic energy detectors.

22. The portal detection system according to claim 1, wherein the one more acoustic energy detectors comprises multiple acoustic energy detectors each detecting acoustic energy derived from a single pulse of acoustic energy reflected and/or refracted by said object, said signal processor calculating a time of detection of said acoustic energy by each of said multiple detectors, a distance of said object from each of said multiple detectors, and a position of said object relative to each of said multiple detectors, thereby determining a location of said object upon said human subject.

23. The portal detection system according to claim 22, wherein said position of said object relative to said multiple detectors is determined by triangulation.

24. The portal detection system according to claim 22, wherein the position of said object relative to said multiple detectors is calculated according to equations 1, 2, and 3:

$$(x-x_1)^2+(y-y_1)^2+(z-z_1)^2=R_1^2 \quad (1)$$

$$(x-x_2)^2+(y-y_2)^2+(z-z_2)^2=R_2^2 \quad (2)$$

$$(x-x_3)^2+(y-y_3)^2+(z-z_3)^2=R_3^2 \quad (3)$$

where $(x_1, y_1, z_1)$, $(x_2, y_2, z_2)$ and $(x_3, y_3, z_3)$ are co-ordinates in three dimensional space indicative of the locations of three detectors, and $R_1$, $R_2$, and $R_3$ are distances of each detector from the object.

25. The portal detection system according to claim 2, further including shoe scanning means connected to said signal processor for scanning shoes worn upon said human subject, for detecting one or more objects concealed within said shoes.

26. The portal detection system according to claim 25, wherein the shoe scanning means includes one or more acoustic energy transmitters oriented to direct acoustic energy towards said shoes, and one or more acoustic energy detectors oriented to receive acoustic energy reflected or refracted from said shoes.

27. The portal detection system according to claim 25, further comprising a floor plate, wherein said shoe scanning means is integral with said floor plate.

28. The portal detection system according to claim 27, wherein the floor plate comprises a material of substantially similar density and material to materials commonly used in shoe sole manufacture, thereby improving acoustic coupling through an interface between the floor plate and the lower layer(s) of each shoe.

29. The portal detection system according to claim 25, wherein said shoe scanning means includes one or more acoustic energy transmitters and one or more acoustic energy receivers mounted on a lower portion of said frame.

30. The portal detection system according to claim 1, further including sensing means for sensing a presence of said human subject and initiating activation of said one or more acoustic energy transmitters and said one or more acoustic energy detectors for a predetermined time window, said scan profile generated within said predetermined time window.

31. The portal detection system according to claim 1, wherein said system further includes display means, said signal processor means calculating a position of said object relative to said human subject, said display means providing schematic illustration of said position.

32. The portal detection system according to claim 1, wherein said signal processor processes said acoustic signals to generate said scan profile, said scan profile comprising a reflection coefficient, said comparator means comparing said scan profile to known scan profiles each comprising a known reflection coefficient, to determine a presence of said object.

33. The portal detection system according to claim 32, wherein said reflection coefficient is calculated according to equation 4:

$$R=(Z1-Z2)/(Z1+Z2) \quad (4)$$

where
R=reflection coefficient (db)
Z1=impedance of the layer prior to the reflecting surface
Z2=impedance of the reflection layer.

34. The portal detection system according to claim 1, wherein said acoustic energy transmitter directs acoustic energy comprising multiple known frequency components to said human subject, said signal processor processing said acoustic signals to generate said scan profile, said scan profile comprising a rate of change of absorption as a function of frequency, said comparator means comparing said scan profile to known scan profiles each comprising a known rate of change of absorption as a function of frequency, to determine a presence and/or a substance of said object.

35. The portal detection system according to claim 1, wherein the signal processor further processes said acoustic energy signals to generate an object signature characteristic of the substance of the object, said object signature forming part of said scan profile, said comparator means comparing said scan profile with known scan profiles to identify the presence of the object and the substance of the object.

36. The portal detection system according to claim 35, wherein said signal processor means further processes said reflected and/or refracted acoustic energy signals, to calculate an acoustic impedance, an acoustic velocity and/or absorption of said object, said object signature being derived at least in part from the acoustic impedance, the acoustic velocity and/or absorption of said object.

37. The portal detection system according to claim 1, wherein the signal processor compensates for different acoustic properties of each type of clothing.

38. The portal detection system according to claim 1, wherein the one or more acoustic energy transmitters, and the one or more acoustic energy detectors scans the human subject multiple times to generate multiple acoustic energy signals.

39. A portal detection system for remote detection of an object concealed beneath the skin of a human subject, the portal detection system comprising:

one or more acoustic energy transmitters for generating acoustic energy and directing the acoustic energy towards the human subject;

one or more acoustic energy detectors for detecting acoustic energy reflected and/or refracted from the human subject, to generate acoustic energy signals;

signal processor means for processing the acoustic energy signals to generate one or more scan profiles of the human subject;

comparator means for comparing the scan profile with known scan profiles to detect a presence of said object beneath said skin.

40. The portal detection system according to claim 39, wherein the signal processor and the comparator means enable differentiation between each layer of skin and/or clothing to determine the layer comprising the object.

41. The portal detection system according to claim 1, further comprising metal detection means.

42. Use of a portal detection system according to claim 1, for scanning a human subject for one or more objects concealed beneath the clothing of the human subject wherein the use comprises:

passing the human subject through the portal detection system;

scanning the human subject by directing acoustic energy from said one or more acoustic energy transmitters towards the human subject, and detecting acoustic energy reflected and/or refracted from the human subject with said one or more acoustic energy detectors to generate acoustic energy signals;

processing the acoustic energy signals with said signal processor means to generate said one or more scan profiles; and comparing the scan profiles with known scan profiles via said comparator means, thereby to detect said one or more objects.

43. A method of scanning a human subject for one or more objects concealed beneath the clothing of the human subject, the method comprising the steps of:

providing a portal detection system according to claim 1; and passing the human subject through the portal detection system;

scanning the human subject by directing acoustic energy from said one or more acoustic energy transmitters towards the human subject, and detecting acoustic energy reflected and/or refracted from the human subject with said one or more acoustic energy detectors to generate acoustic energy signals;

processing the acoustic energy signals with said signal processor means to generate said one or more scan profiles; and comparing the scan profiles with known scan profiles via said comparator means, thereby to detect said one or more objects.

44. The portal detection system according to claim 39, further comprising metal detection means.

45. Use of a portal detection system according to claim 39, for scanning a human subject for one or more objects concealed beneath the skin of the human subject wherein the use comprises:

passing the human subject through the portal detection system;

scanning the human subject by directing acoustic energy from said one or more acoustic energy transmitters towards the human subject, and detecting acoustic energy reflected and/or refracted from the human subject with said one or more acoustic energy detectors to generate acoustic energy signals;

processing the acoustic energy signals with said signal processor means to generate said one or more scan profiles; and comparing the scan profiles with known scan profiles via said comparator means, thereby to detect said one or more objects.

46. A method of scanning a human subject for one or more objects concealed beneath the skin of the human subject, the method comprising the steps of:

providing a portal detection system according to claim 39; and passing the human subject through the portal detection system;

scanning the human subject by directing acoustic energy from said one or more acoustic energy transmitters towards the human subject, and detecting acoustic energy reflected and/or refracted from the human subject with said one or more acoustic energy detectors to generate acoustic energy signals;

processing the acoustic energy signals with said signal processor means to generate said one ore more scan profiles; and comparing the scan profiles with known scan profiles via said comparator means, thereby to detect said one or more objects.

* * * * *